United States Patent Office 3,337,559
Patented Aug. 22, 1967

3,337,559
DIETHERS OF YOHIMBINE ALCOHOL
Alfred Popelak, Mannheim, Gustav Lettenbauer, Lampertheim, Hessen, Wolfgang Schaumann, Mannheim-Waldhof, and Annemarie Ribbentrop, Mannheim, Germany, assignors to C. F. Boehringer & Soehne G.m.b.H., Mannheim-Waldhof, Germany, a corporation of Germany
No Drawing. Filed June 5, 1964, Ser. No. 373,040
Claims priority, application Germany, June 7, 1963, B 72,205
6 Claims. (Cl. 260—288)

ABSTRACT OF THE DISCLOSURE

Yohimbine alcohols of the formula:

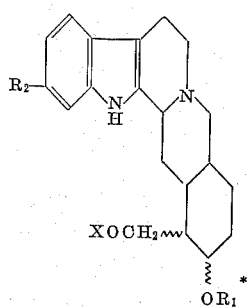

*Indicates that the substituent may be above or below the plane of the drawing, i.e., the bond may be designated by a solid or dashed line.

wherein $R_1$ is alkyl, $R_2$ is hydrogen or alkoxy and X is alkyl, aralkyl, cycloalkyl or cycloalkyl containing oxygen atoms and their acid addition and quaternary ammonium salts consisting vasodilating and tranquilizing agents.

This invention relates to diethers of yohimbine alcohol and more particularly is concerned with diethers of yohimbine alcohol useful as vasodilating and tranquilizing agents.

There are provided according to this invention novel diethers of yohimbine alcohol of the formula:

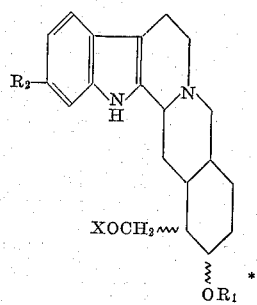

Formula I

*Indicates that the substituent may be above or below the plane of the drawing, i.e., the bond may be designated by a solid or dashed line.

wherein $R_1$ is an alkyl group, particularly a lower alkyl group, $R_2$ is hydrogen or an alkoxy group, particularly a lower alkoxy group and X is an alkyl group, aralkyl group or cycloalkyl group and can also represent such group containing one or more oxygen atoms, and acid addition and quaternary ammonium salts thereof.

Compounds of the above formula are produced by etherification of a carbinol having the following formula:

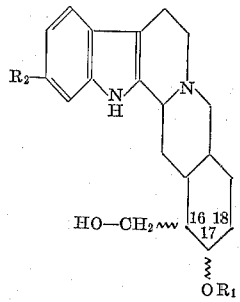

Formula II wherein $R_1$ represents alkyl, particularly lower alkyl, and $R_2$ represents hydrogen or alkoxy, particularly lower alkoxy, in the conventional manner, as, for example, by reaction with a diazoalkane in the presence of a catalyzing complex former, as, for instance, an aluminum alcoholate, or by alcoholysis of the sulfo acid ester, for example, the tosylate which can very easily be prepared from the carbinol, in those instances where X represents a group containing an oxygen atom, the etherification is preferably carried out using dihydropyran or dihydrofuran.

The carbinols of Formula II are preferably prepared by reduction of a compound having the formula:

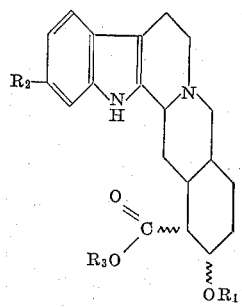

Formula III wherein $R_1$ represents alkyl, particularly lower alkyl, $R_2$ represents hydrogen or alkoxy, particularly lower alkoxy and $R_3$ presents hydrogen or alkyl, in the conventional manner.

The reduction of the compounds of Formula III is preferably carried out using complex metal hydrides as, for example, lithium aluminum hydride as reducing agent or, alternatively, the reduction may be effected employing sodium in alcohol as, for example, butanol according to the Bouveault-Blanc method.

Acid addition salts of the novel compounds provided by this invention are produced by contacting the diether with a mineral or organic acid such as hydrochloric, sulfuric, formic, maleic, fumaric, and citric and related acids.

Quaternary ammonium salts are produced by reacting the diether with a suitable alkylating agent such as dimethyl sulfate, methyl bromide, ethyl bromide, methyl iodide, O-chloro benzyl bromide, and ethyl iodide. The acid addition salts and quaternary ammonium salts of the diethers of yohimbine alcohol are also useful as vasodilating agents and tranquilizing agents.

The following examples are added to illustrate the preparation of representative compounds provided by the invention, but it is to be understood that the invention shall not thereby be restricted.

EXAMPLE 1

Yohimbinealcohol-dimethylether

A solution of 8.1 grams yohimbine-17-methylether having a melting point of 212-213° C. was added dropwise with agitation to a suspension of 3 grams of lithium aluminum hydride in 100 ml. absolute tetrahydrofuran. The resulting mixture was agitated for 1 hour at room temperature. The excess lithium aluminum hydride was decomposed by addition of a concentrated solution of ammonium sulfate to the mixture, the addition having been made while the mixture was cooled with ice. The precipitated aluminum hydroxide was removed by suction filtering and washed with a mixture of methylene chloride and 10% methanol. The filtrate and the wash solution were combined, vacuum dried, and the residue (6.9 g.) recrystallized from a mixture of isopropanol and methylene chloride. The colorless crystals thus obtained melted at 257–258° C. The yield amounted to 6.75 grams. $[\alpha]_D^{20} = +19.5 \pm 0.5$ (c.=1 in chloroform).

$C_{21}H_{28}O_2N_2$ (340.45) Calc.: C, 74.08; H, 8.29; N, 8.23%. Found: C, 73.71; H, 8.00; N, 8.25%.

4 g. of the yohimbine alcohol-17-methylether thus obtained and 2.4 g. (1 mol) aluminum isopropylate were dissolved in 250 ml. absolute methylene chloride. 200 ml. of a saturated solution of diazomethane in methylene chloride were then added to the resulting solution and the solution thereby formed allowed to stand for 12 hours at room temperature. This mixture was stirred with a solution of 4 g. tartaric acid in 50 ml. water and made alkaline with concentrated ammonia. The methylene chloride phase was separated out and the aqueous solution remaining repeatedly extracted with methylene chloride. The combined methylene chloride extracts were dried over sodium sulfate and the solvent removed by vacuum distillation. The residue (3.5 g.) recrystallized from methanol-methylene chloride solution produced 3.2 g. of colorless crystals containing 1 mol of methanol of crystallization and having a melting point of 128–135° C. $[\alpha]_D^{20} = +21.9 \pm 0.5$ (c.=1 in chloroform).

$C_{22}H_{30}N_2O_2 \cdot CH_3OH$ (386.5) Calc.: C, 71.47; H, 8.87; N, 7.25%. Found: C, 71.46; H, 8.64; N, 7.51%.

EXAMPLE 2

α-Yohimbinealcohol-dimethylether 6.0 g. α-yohimbine-17-methylether having a melting point of 267° C. were reduced with 2.5 g. lithium aluminum hydride in 350 ml. absolute tetrahydrofuran by the procedure set out in Example 1. The concentrate, amounting to 5.7 g., which was obtained following processing produced 5.2 g. of colorless crystals having a melting point of 224–226° C. following recrystallization from isopropanol. $[\alpha]_D^{20} = -39.0 \pm 0.5$ (c.=1 in chloroform).

$C_{21}H_{28}O_2N_2$ (340.45) Calc.: C, 74.08; H, 8.29; N, 8.23%. Found: C, 73.81; H, 8.41; N, 8.31%.

4 g. of the α-yohimbinealcohol-17-methylether as just obtained were etherified with diazomethane by a method analogous to that described in Example 1. 4.3 g. of a residue were obtained following processing and were recrystallized from a methylene chloride and methanol mixture. 3.1 g. of crystals having a melting point of 207–209° C. were thereby obtained. The hydrochloride corresponding to the base was prepared in the conventional manner and melted at 296° C.

$C_{22}H_{30}O_2N_2$ (354.5) Calc.: C, 74.54; H, 8.53; N, 7.90%. Found: C, 74.38; H, 8.38; N, 7.98%.

EXAMPLE 3

β-Yohimbinealcohol-dimethylether 5.3 grams β-yohimbine-17-methyl ether were reduced with lithium aluminum hydride in 250 ml. tetrahydrofuran by the method described in Example 1. 4.2 grams β-yohimbinealcohol-17-methylether were thereby obtained. This compound, when recrystallized from isopropanol, contained 1 mol of alcohol of crystallization and melted at 219–222° C. $[\alpha]_D^{20} = -52.8 \pm 0.3$ (c.=1 in chloroform).

$C_{21}H_{28}O_2N_2 \cdot C_3H_7OH$ (400.5) Calc.: C, 71.97; H, 9.06; N, 7.00%. Found: C, 71.86; H, 8.83; N, 7.06%.

3.2 β-yohimbinealcohol-17-methylether thus obtained were methylated with diazomethane in the presence of 2 g. aluminum isopropylate by a procedure analogous to that set out in Example 1. The amorphous residue thereby obtained (2.75 g.) was recrystallized from diisopropyl ether-methylene chloride mixture. There were recovered 2.2 g. of colorless crystals having a melting point of 201–203° C. $[\alpha]_D^{23} = +32.9 \pm 0.3$ (c.=1 in chloroform).

$C_{22}H_{30}O_2N_2$ (354.5) Calc.: C, 74.54; H, 8.53; N, 7.90%. Found: C, 74.69; H, 8.39; N, 7.71%.

EXAMPLE 4

O-n-butyl-yohimbinealcohol-17-methylether 4.0 g. O-tosyl-yohimbinealcohol-17-methyl-ether having a melting point of 189–191° C., $[\alpha]_D^{25} = +28.5 \pm 0.6$ (c.=1 in chloroform) were heated under reflux for 6 hours together with a solution of 0.37 g. sodium in 130 ml. n-butanol. The n-butanol was then removed by vacuum distillation, the residue dissolved in 50 ml. water and extracted repeatedly by shaking with methylene chloride. The combined methylene chloride extracts were vacuum-dried and the residue which amounted to 2.9 g. re-crystallized from methanol. The colorless crystals obtained melted with decomposition at 80–90° C. The corresponding hydrochloride was prepared in the conventional manner and, following re-crystallization from a mixture of isopropanol and methylene chloride, melted at 294–296° C. $[\alpha]_D^{23} = +43.4 \pm 1$ (c.=1 in 1:2 chloroform: methanol).

$C_{25}H_{36}N_2O_2 \cdot HCl$ (433.0) Calc.: C, 69.34; H, 8.61; N, 6.47; Cl, 8.19%. Found: C, 69.43; H, 8.43; N, 6.43; Cl, 8.35%.

EXAMPLE 5

O-tetrahydropyranyl-yohimbinealcohol-17-methylether 2 g. 17-O-methylyohimbinealcohol having a melting point of 257–258° C. were dissolved in about 50 ml. absolute dimethyl formamide. 3.4 g. dihydropyran and 3.4 ml. 2 N-ethereal solution of hydrochloric acid were then added to the resulting solution. The solution was allowed to stand for 3 hours at 5° C. and then diluted with about 200 ml. methylene chloride and repeatedly extracted by shaking with cold sodium bicarbonate solution followed by shaking with water. The methylene chloride phase following drying over sodium sulfate and removal of the solvent by distillation produced 2.6 g. of residue. 1.9 g. of colorless crystals having a melting point of 102–106° C. were obtained by re-crystallizing the residue from isopropanol. The crystals contained 1 mol. of alcohol of crystallization and, following drying in high vacuum, the melting point rose to 105–108° C. $[\alpha]_D^{25} = +21.6 \pm 0.5$.

$C_{26}H_{36}N_2O_3 \cdot C_3H_8O$ (484.66). Calc.: C, 71.86; H, 9.15; N, 5.78%. Found: C, 71.93; H, 8.96; N, 6.10%.

EXAMPLE 6

18-desoxy-reserpinealcohol-methylether 3.7 g. 18-desoxy-reserpinealcohol having a melting point of 258° C. were dissolved in 300 ml. absolute methylene chloride and, following the addition of 2 g. aluminum isopropylate, the mixture was methylated with diazo methane. The base which was obtained was dissolved in benzene and purified chromatographically over 30 g. aluminum oxide. On recrystallization from diisopropyl ether, the base melted at 164–165° C. The hydrochloride prepared using ethereal hydrochloric acid and re-crystallized from isopropanol melted at 237–238° C. $[\alpha]_D^{22} = +23.9 \pm 0.5$ ($CH_3OH$; c.=1); yield: 2.9 g.

$C_{23}H_{32}N_2O_3 \cdot HCl$ (420.99). Calc.: C, 65.61; H, 7.90; N, 6.65; Cl, 8.42%. Found: C, 65.47; H, 7.80; N, 6.59; Cl. 8.50%.

The compounds of the invention have particularly interesting pharmacological properties constituting particularly effective vasodilating and tranquilizing agents. In order to establish the pharmacological activities of the new compounds and to better evaluate these activities as compared to a known compound, the following procedures were carried out using in that connection the compounds as hereinafter set out.

(1) reserpine-comparison compound
(2) 18-desoxy-reserpinealcohol-methylether
(3) yohimbinealcohol-dimethylether
(4) α-yohimbinealcohol-dimethylether
(5) β-yohimbinealcohol-dimethylether

I. EFFECT ON THE CENTRAL NERVOUS SYSTEM (CNS)

(a) The *sedative effect* was determined on the basis of the potentiation of thiopental narcosis in the mouse by Taeschler's method (J. Pharmacol. Exper. Ther. 120, 179, 1959). The ED50 in mg. per kg. of body weight was determined 30 and 240 minutes after subcutaneous injection of the test compounds, in order to follow the course of the sedation obtained.

(b) The *tranquilizing effect* was evaluated on the basis of the inhibition of secondarily caused reactions (SCR) in the rat by the procedure of Maffii (J. Pharm. Pharmacol. 11, 129, 1959). Three to four groups of 10 rats each were tested 4 to 6 hrs. after subcutaneous injection of various doses of the test compounds, each group being tested 5 times. The ED50 in mg. per kg. of body weight, which is set out in Table I was determined from the percentage of inhibition at the various dosages.

The object and purpose of the tests were to be able to specify the *working character* of the tested compounds as a selective tranquilization. The lower the quotient obtained by dividing the ED50 of the SCR inhibition by the ED50 of the thiopental narcosis, the closer one approaches these aims.

II. VASODILATORY EFFECT

The blood from the carotid artery of anaesthetized rabbits was transfused with a perfusion pump to the femoral artery at a constant volume. A manometer attached laterally to the perfusion tube in advance of its junction with the femoral artery registered the pressure in the vascular area of the hind leg. Pressure variations then had to be caused exclusively by changes in the diameter of the blood vessels, i.e., if substances injected into the artery through the perfusion tube had a vasodilatory effect, the perfusion pressure decreased.

The effectiveness of the tested substances has been expressed in the table as a percentage of the effectiveness of Raubasin, which was used as the standard.

The results of the procedures are set out in the following table:

TABLE I

| Sub-stance | Thiopental-Narcosis | | Inhibition of Secondarily Caused Reactions (SCR) | ED50SCR / ED50 Thiopental-Narcosis | Vascular Effect |
|---|---|---|---|---|---|
| | 30 min. | 240 min. | | | |
| 1 | 7.0 | 0.1 | 0.8 | 8 | |
| 2 | 2.4 | ≥40 | 1.18 | 0.5 | |
| 3 | | | | | 55 |
| 4 | | | | | 361 |
| 5 | | | | | 87 |

WITH REFERENCE TO EFFECT ON THE CENTRAL NERVOUS SYSTEM

From the table, the superiority over reserpine can be shown on the basis of the following findings:

(a) On the basis of a specific tranquilizing effect 18-desoxy-reserpine alcohol-methyl-ether is superior to the reserpine comparison compound.

(b) Reserpine is characterized by the fact that its effect sets in very slowly. The ED50 in the thiopental test amounted after 30 minutes to 7.0 and after 240 minutes to 0.1 mg. per kg. In comparison the ED50 of 18-desoxy-reserpine alcohol-methyl ether was 2.4 after 30 minutes and its effect had completely ceased after 4 hours (indicating that the same is a short acting compound).

A more rapid onset and a shorter duration of effect are advantageous, since the protracted effect of reserpine makes the control of the dose more difficult.

WITH REFERENCE TO VASODILATORY EFFECT

The considerable superiority of α-yohimbinealcohol-dimethylether over Raubasin is obvious from the table to be 3.6 fold more active.

The compositions of the invention are put up in any suitable dosage form such as tablets or the common powder mix papers, or capsules, for oral administration. They can also be administered intravenously and intramuscularly. For parenteral use or in the capsules or tablets, the composition need only consist of the selected diethers of yohimbine alcohols of the type described herein as having a specific tranquilizing or vasodilating effect. In the case of the tablet there is included a suitable binder compatible with the principal ingredient and nontoxic when taken in the amount and frequency resulting from administration regimen of the preparation. In the case of the injectible, the compound is administered in the form of its solution or suspension in water or other aqueous menstruum, i.e., aqueous suspending medium, or in any of the commonly used oil menstruums, i.e., oil suspending media.

We claim:
1. Yohimbine-alcohol-dimethylether.
2. α-Yohimbinealcohol-dimethylether.
3. β-Yohimbinealcohol-dimethylether.
4. O-n-butyl-yohimbinealcohol-17-methylether.
5. O-tetrahydropyranyl-yohimbinealcohol-17-methylether.
6. 18-desoxy-reserpinealcohol-methylether.

References Cited

UNITED STATES PATENTS

| | | | |
|---|---|---|---|
| 2,786,843 | 3/1957 | Heiebner | 260—287 |
| 3,052,681 | 9/1962 | Simmons | 260—288 |
| 3,076,811 | 2/1963 | Bartlett | 260—288 |
| 3,190,800 | 6/1965 | Furst | 167—65 |
| 3,216,898 | 11/1965 | Fellows | 167—65 |

WALTER A. MODANCE, *Primary Examiner.*

JULIAN LEVITT, *Examiner.*

JAMES A. PATTEN, STANLEY J. FRIEDMAN,
*Assistant Examiners.*